US011131047B2

(12) United States Patent
Theerakaew et al.

(10) Patent No.: US 11,131,047 B2
(45) Date of Patent: Sep. 28, 2021

(54) WASHING MACHINE

(71) Applicant: Toshiba Lifestyle Products & Services Corporation, Kawasaki (JP)

(72) Inventors: Sinard Theerakaew, Pathumthani (TH); Chotika Chalotorn, Pathumthani (TH); Sittiporn Thangtongchai, Pathumthani (TH)

(73) Assignee: Toshiba Lifestyle Products & Services Corporation, Kawasaki (JP)

( * ) Notice: Subject to any disclaimer, the term of this patent is extended or adjusted under 35 U.S.C. 154(b) by 15 days.

(21) Appl. No.: 16/506,715

(22) Filed: Jul. 9, 2019

(65) Prior Publication Data

US 2019/0330778 A1 Oct. 31, 2019

Related U.S. Application Data

(63) Continuation of application No. PCT/JP2018/001598, filed on Jan. 19, 2018.

(30) Foreign Application Priority Data

Apr. 3, 2017 (JP) ............................ JP2017-073739

(51) Int. Cl.
*D06F 23/04* (2006.01)
*D06F 13/00* (2006.01)
(Continued)

(52) U.S. Cl.
CPC .............. *D06F 23/04* (2013.01); *D06F 13/00* (2013.01); *D06F 37/12* (2013.01); *D06F 37/24* (2013.01); *D06F 39/087* (2013.01); *D06F 33/00* (2013.01)

(58) Field of Classification Search
None
See application file for complete search history.

(56) References Cited

U.S. PATENT DOCUMENTS 5,887,457 A * 3/1999 Yu .......................... D06F 13/00 68/23.7
2010/0175434 A1* 7/2010 Park ...................... D06F 17/10 68/147
(Continued)

FOREIGN PATENT DOCUMENTS

CN 85104576 A 12/1986
JP 52-83572 U 6/1977
(Continued)

OTHER PUBLICATIONS

Espacenet translation of JPH10118382, Electric Washing Machine, 1998 (Year: 1998).*
(Continued)

*Primary Examiner* — Cristi J Tate-Sims
(74) *Attorney, Agent, or Firm* — Oblon, McClelland, Maier & Neustadt, L.L.P.

(57) ABSTRACT

A washing machine includes: a vertical axis type washing tub in which laundry and a washing liquid are housed and a washing operation including a wash step is performed; and a roller rotatably provided in an inner wall portion of the washing tub in a state that a rotation axis is vertically oriented, the roller being rotated to facilitate movement of laundry, wherein a water level of the washing liquid in the washing tub is settable in a plurality of levels ranging from a minimum water level to a maximum water level, and the roller is disposed such that an entire vertical length extends over two or more water levels among the plurality of set water levels.

9 Claims, 12 Drawing Sheets

(51) Int. Cl.

| | |
|---|---|
| ***D06F 37/12*** | (2006.01) |
| ***D06F 37/24*** | (2006.01) |
| ***D06F 39/08*** | (2006.01) |
| *D06F 33/00* | (2020.01) |

(56) References Cited

U.S. PATENT DOCUMENTS

2011/0179584 A1* 7/2011 Kim ........................ D06F 23/04 8/137
2017/0107988 A1* 4/2017 Kulkarni ................. D06F 33/00

FOREIGN PATENT DOCUMENTS

| | | |
|---|---|---|
| JP | 10-57673 | 3/1996 |
| JP | 10-118382 | 5/1998 |
| JP | 2007-167544 | 7/2007 |
| JP | 2008-178726 | 8/2008 |
| JP | 2010-172738 | 8/2010 |
| JP | 2013-220255 | 10/2013 |
| JP | 2015-29546 | 2/2015 |
| JP | 2015-156881 | 9/2015 |
| KR | 10-2005-0003484 A | 1/2005 |

OTHER PUBLICATIONS

International Search Report dated Feb. 27, 2018 in PCT/JP2018/001598 filed Jan. 19, 2018 (with English Translation).
Office Action dated Dec. 9, 2020 in corresponding Chinese Patent Application No. 201880017401.4; 6 pages.

* cited by examiner

| WATER LEVEL (CLOTH AMOUNT) | WATER VOLUME (L) | HEIGHT (mm) |
|---|---|---|
| 1 | 105 | 405 |
| 2 | 97 | 335 |
| 3 | 91 | 330 |
| 4 | 82 | 285 |
| 5 | 76 | 265 |
| 6 | 69 | 230 |
| 7 | 60 | 205 |
| 8 | 55 | 180 |
| 9 | 46 | 150 |
| 10 | 25 | 48 |

| WATER LEVEL | SET WATER LEVEL (HEIGHT FROM TUB BOTTOM) (mm) | FIRST WATER LEVEL (mm) | SECOND WATER LEVEL (mm) | DETERGENT DISSOLVING OPERATION START WATER LEVEL (mm) |
|---|---|---|---|---|
| | HIGH | LOW | MEDIUM | |
| 1 | 405 | 400 | 400 | 345 |
| 2 | 335 | 333 | 333 | 127 |
| 3 | 330 | 302 | 315 | 92 |
| 4 | 285 | 281 | 283 | 92 |
| 5 | 265 | 235 | 248 | 92 |
| 6 | 230 | 212 | 222 | 92 |
| 7 | 205 | 180 | 187 | 92 |
| 8 | 180 | 151 | 164 | 2 |
| 9 | 150 | 108 | 128 | 2 |
| 10 | 48 | 41 | 47 | 2 |

| CLOTH AMOUNT (kg) | WATER LEVEL | WATER VOLUME (L) | CONCENTRATED WASHING OPERATION DETERGENT DISSOLVING OPERATION | | | | | | | SECOND AGITATING OPERATION | | | | | | | INITIAL WASHING OPERATION (ST WATER FLOW) | | | | | | |
|---|---|---|---|---|---|---|---|---|---|---|---|---|---|---|---|---|---|---|---|---|---|---|---|
| | | | N R | Angle degree | Stop | R R | Angle degree | Stop | Motor rpm | N R | Angle degree | Stop | R R | Angle degree | Stop | Motor rpm | N R | Angle degree | Stop | R R | Angle degree | Stop | Motor rpm |
| 12.0 | 1 | 105 | 0.9 | 648 | 0.5 | 0.9 | 648 | 0.5 | 120 | 0.8 | 720 | 0.8 | 0.5 | 450 | 0.8 | 150 | SAME AS WITH A WATER FLOW | | | | | | |
| | | | 0.3 | 126 | 1.0 | 0.3 | 126 | 1.0 | 70 | | | | | | | | | | | | | | |
| 10.0 | 2 | 97 | 0.9 | 648 | 0.5 | 0.9 | 648 | 0.5 | 120 | 0.5 | 420 | 0.8 | 0.5 | 420 | 0.8 | 140 | | | | | | | |
| | | | 0.3 | 126 | 1.0 | 0.3 | 126 | 1.0 | 70 | | | | | | | | | | | | | | |
| 8.0 | 3 | 91 | 0.8 | 432 | 0.5 | 0.8 | 432 | 0.5 | 90 | 0.4 | 288 | 0.8 | 0.4 | 288 | 0.8 | 120 | | | | | | | |
| | | | 0.3 | 108 | 1.0 | 0.3 | 108 | 1.0 | 60 | | | | | | | | | | | | | | |
| 7.0 | 4 | 82 | 0.8 | 432 | 0.5 | 0.8 | 432 | 0.5 | 90 | 0.4 | 288 | 0.8 | 0.4 | 288 | 0.8 | 120 | | | | | | | |
| | | | 0.3 | 108 | 1.0 | 0.3 | 108 | 1.0 | 60 | | | | | | | | | | | | | | |
| 6.0 | 5 | 76 | 0.8 | 432 | 0.5 | 0.8 | 432 | 0.5 | 90 | 0.4 | 288 | 0.8 | 0.4 | 288 | 0.8 | 120 | | | | | | | |
| | | | 0.3 | 108 | 1.0 | 0.3 | 108 | 1.0 | 60 | | | | | | | | | | | | | | |
| 5.0 | 6 | 69 | 0.4 | 276 | 1.0 | 0.4 | 276 | 0.9 | 115 | 0.4 | 288 | 0.8 | 0.4 | 288 | 0.8 | 120 | | | | | | | |
| | | | 0.3 | 108 | 1.0 | 0.3 | 108 | 1.0 | 60 | | | | | | | | | | | | | | |
| 4.0 | 7 | 60 | 0.4 | 276 | 1.0 | 0.4 | 276 | 0.9 | 115 | 0.4 | 288 | 0.8 | 0.4 | 288 | 0.8 | 120 | | | | | | | |
| | | | 0.3 | 432 | 1.0 | 0.3 | 162 | 1.0 | 90 | | | | | | | | | | | | | | |
| 3.0 | 8 | 55 | 0.3 | 180 | 1.0 | 0.3 | 180 | 0.9 | 100 | 0.4 | 192 | 1.2 | 0.4 | 192 | 1.2 | 80 | | | | | | | |
| | | | 0.8 | 108 | 1.0 | 0.3 | 108 | 1.0 | 60 | | | | | | | | | | | | | | |
| 2.0 | 9 | 46 | 0.3 | 180 | 1.0 | 0.3 | 180 | 0.9 | 100 | 0.4 | 192 | 1.2 | 0.4 | 192 | 1.2 | 80 | | | | | | | |
| | | | 0.3 | 108 | 1.0 | 0.3 | 108 | 1.0 | 60 | | | | | | | | | | | | | | |
| 1.0 | 10 | 25 | 0.3 | 180 | 1.0 | 0.3 | 180 | 0.9 | 100 | 0.4 | 192 | 1.2 | 0.4 | 192 | 1.2 | 80 | 1.0 | 420 | 0.6 | 1.0 | 420 | 0.6 | 70 |
| | | | 0.3 | 108 | 1.0 | 0.3 | 108 | 1.0 | 60 | | | | | | | | | | | | | | |

FIG.9

| CLOTH AMOUNT (kg) | WATER LEVEL | WATER VOLUME (L) | WASHING OPERATION | | | | | | | | | | | | | | | | | | | | | LOOSENING OPERATION | | | | | | |
|---|---|---|---|---|---|---|---|---|---|---|---|---|---|---|---|---|---|---|---|---|---|---|---|---|---|---|---|---|---|---|
| | | | S WATER FLOW | | | | | | | A WATER FLOW | | | | | | | B WATER FLOW | | | | | | | | | | | | | |
| | | | N R | Angle degree | Stop | R R | Angle degree | Stop | Motor rpm | N R | Angle degree | Stop | R R | Angle degree | Stop | Motor rpm | N R | Angle degree | Stop | R R | Angle degree | Stop | Motor rpm | N R | Angle degree | Stop | R R | Angle degree | Stop | Motor rpm |
| 12.0 | 1 | 105 | 0.5 | 450 | 2.0 | 4.0 | 3600 | 2.0 | 150 | 4.5 | 4050 | 2.0 | 3.5 | 3150 | 2.0 | 150 | 2.0 | 1800 | 2.0 | 2.0 | 1800 | 2.0 | 150 | 0.5 | 420 | 0.6 | 0.5 | 420 | 0.6 | 140 |
| 10.0 | 2 | 97 | 0.5 | 450 | 2.0 | 4.0 | 3600 | 2.0 | 150 | 3.0 | 2520 | 0.8 | 3.0 | 2520 | 0.8 | 140 | 1.2 | 1080 | 1.0 | 1.2 | 1080 | 1.0 | 150 | 0.5 | 420 | 0.6 | 0.5 | 420 | 0.6 | 140 |
| 8.0 | 3 | 91 | SAME AS WITH A WATER FLOW | | | | | | | 3.0 | 2520 | 0.8 | 3.0 | 2520 | 0.8 | 140 | 0.8 | 672 | 1.0 | 0.8 | 672 | 1.0 | 140 | 0.5 | 390 | 0.6 | 0.5 | 390 | 0.6 | 130 |
| 7.0 | 4 | 82 | | | | | | | | 3.0 | 2520 | 0.8 | 3.0 | 2520 | 0.8 | 140 | 0.8 | 672 | 1.0 | 0.8 | 672 | 1.0 | 140 | 0.5 | 390 | 0.6 | 0.5 | 390 | 0.6 | 130 |
| 6.0 | 5 | 76 | | | | | | | | 2.0 | 1320 | 0.8 | 2.0 | 1320 | 0.8 | 110 | 0.8 | 672 | 1.0 | 0.8 | 672 | 1.0 | 140 | 0.5 | 390 | 0.6 | 0.5 | 390 | 0.6 | 130 |
| 5.0 | 6 | 69 | | | | | | | | 2.0 | 1320 | 0.8 | 2.0 | 1320 | 0.8 | 110 | 0.8 | 672 | 1.0 | 0.8 | 672 | 1.0 | 140 | 0.5 | 390 | 0.6 | 0.5 | 390 | 0.6 | 130 |
| 4.0 | 7 | 60 | | | | | | | | 1.4 | 1134 | 0.7 | 1.4 | 1134 | 0.7 | 135 | 0.8 | 672 | 1.0 | 0.8 | 672 | 1.0 | 140 | 0.3 | 252 | 0.8 | 0.4 | 336 | 0.8 | 140 |
| 3.0 | 8 | 55 | | | | | | | | 1.0 | 540 | 0.6 | 1.0 | 540 | 0.6 | 90 | 0.4 | 264 | 0.9 | 0.4 | 264 | 0.9 | 110 | 0.3 | 180 | 1.6 | 0.3 | 180 | 1.6 | 100 |
| 2.0 | 9 | 46 | | | | | | | | 1.0 | 540 | 0.6 | 1.0 | 540 | 0.6 | 90 | 0.4 | 264 | 0.9 | 0.4 | 264 | 0.9 | 110 | 0.3 | 180 | 1.6 | 0.3 | 180 | 1.6 | 100 |
| 1.0 | 10 | 25 | 0.5 | 264 | 0.9 | 0.4 | 264 | 0.9 | 110 | 0.8 | 336 | 0.6 | 0.8 | 336 | 0.6 | 70 | 0.4 | 264 | 0.9 | 0.4 | 264 | 0.9 | 110 | 0.3 | 180 | 1.6 | 0.3 | 180 | 1.6 | 100 |

FIG.10

WASHING MACHINE

CROSS-REFERENCE TO RELATED APPLICATION

This application is based upon and claims the benefit of priority from Japanese Patent Application No. 2017-073739, filed on Apr. 3, 2017, the entire contents of which are incorporated herein by reference.

TECHNICAL FIELD

Embodiments of the present invention relate to a washing machine.

BACKGROUND ART

In a so-called vertical axis type washing machine, it has been considered to install a roller-like agitating baffle on an inner wall surface of a washing tub so that the agitating baffle is rotatable with a rotation axis vertically oriented (see, for example, Patent Literature 1). In this case, it is possible to efficiently provide an agitation action on laundry by cooperation of rotation of a pulsator provided at the inner bottom of the washing tub and the agitating baffle.

CITATION LIST

Patent Literature

Patent Literature 1: Japanese Patent Laid-Open No. 10-118382

SUMMARY OF INVENTION

Patent Literature 1 mentioned above only describes providing the washing tub with the roller-like agitating baffle. In other words, there is in fact no sufficient and clear definition on how the agitating baffle, that is, the roller should be provided, specifically the installation position and the length of the roller, to enhance the washing effect by the roller.

Hence, there is provided a washing machine provided with a roller in a washing tub, the roller making it possible to sufficiently improve the washing effect.

A washing machine according to the present embodiment includes: a vertical axis type washing tub in which laundry and a washing liquid are housed and washing operation including a wash step is performed; and a roller rotatably provided in an inner wall portion of the washing tub in a state where a rotation axis is vertically oriented, the roller being rotated to facilitate movement of laundry, wherein a water level of the washing liquid in the washing tub is settable in a plurality of levels ranging from a minimum water level to a maximum water level, and the roller is disposed such that an entire vertical length extends over two or more water levels among the plurality of set water levels.

BRIEF DESCRIPTION OF DRAWINGS

FIG. 9 is a table (No. 1) showing the control state of each operation in the wash step at each water level according to the first embodiment.

FIG. 10 is a table (No. 2) showing the control state of each operation in the wash step at each water level according to the first embodiment.

DESCRIPTION OF EMBODIMENTS

(1) First Embodiment

Figure 11:
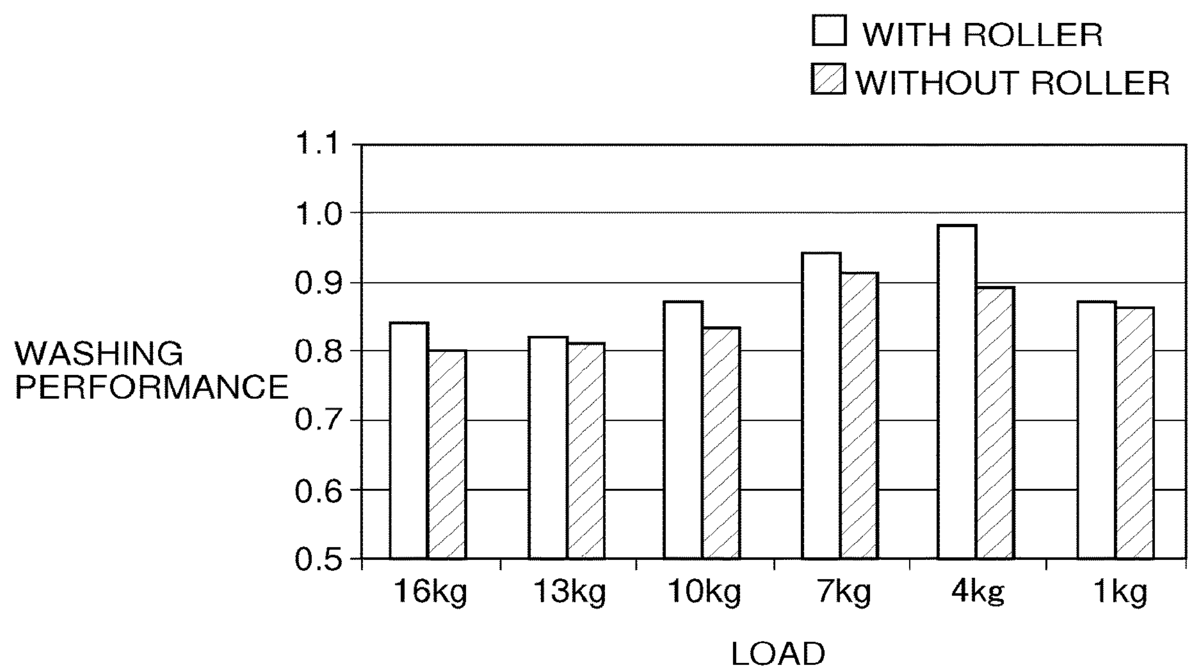
FIG. 11 is a diagram showing test results of examining the washing effects with and without a roller according to the first embodiment.

A first embodiment, which is applied to a so-called vertical axis type washing machine, will be described below with reference to FIG. 11. First, a general structure of a washing machine 1 according to the present embodiment will be described with reference to FIG. 1. The washing machine 1 includes a top cover 3 made of plastic, which is provided in an upper portion of an outer casing 2 that is formed of a steel plate in the shape of a rectangular box as a whole, for example. In the outer casing 2, a water tank 4 capable of storing washing water is provided by being elastically suspended and supported by an elastic suspending assembly (not illustrated) with a well-known structure.

Although not shown in detail, an outlet is formed in the bottom of a water tank 4, and a drain passage provided with a drain valve 13 (see FIG. 5) is connected to the outlet. Moreover, although also not shown in detail, an air trap is provided in the bottom of the water tank 4, and a water level sensor 14 (see FIG. 5) for detecting the water level in the water tank 4, that is, a washing tub 5, through an air tube connected to the air trap is provided. As is known, the water level sensor 14 outputs a detection signal of a frequency corresponding to the water level.

Figure 2:
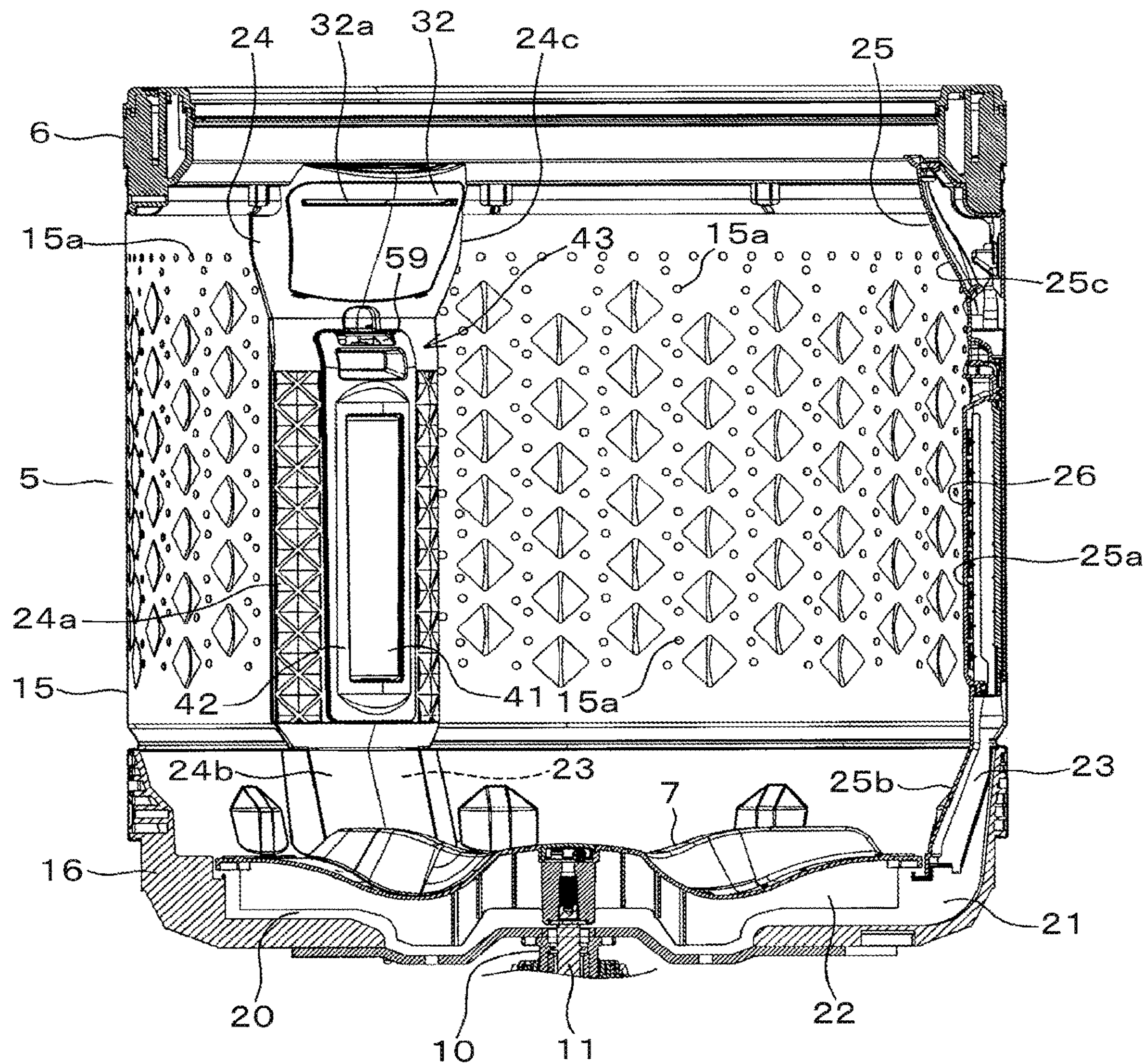
FIG. 2 is a longitudinal sectional view of a cross-section different from FIG. 1, illustrating the structure of a washing tub according to the first embodiment.

In the water tank 4, a washing tub 5 of a vertical axis type, also serving as a spin tub (rotating tub), is rotatably provided. As illustrated in FIG. 2, the washing tub 5 has a bottomed cylindrical shape as a whole, and many drain holes 15*a* are formed in its circumferential wall portion. At an upper end of the washing tub 5, a rotating balancer 6 of a liquid-sealed type is attached, for example. In addition, a pulsator 7 is disposed at the inner bottom of the washing tub 5. The washing tub 5 is configured to house laundry (not illustrated) therein, and washing operation including steps of washing, rinsing, dewatering, and the like of clothes, is performed in the washing tub 5. Detailed structure in the washing tub 5 will be described below.

At the outer bottom of the water tank 4, a drive assembly 8 with a well-known structure is disposed. While detailed illustration and description are eliminated, the drive assembly 8 includes a washing machine motor 9 composed of a DC three-phase brushless motor of an outer rotor type, for example. The drive assembly 8 further includes a hollow tub shaft 10, an agitation shaft 11 passing through the tub shaft 10, a clutch assembly 17 that selectively transmits rotational driving force of the washing machine motor 9 to the shafts 10 and 11, for example. The washing tub 5 is coupled to the upper end of the tub shaft 10, and the pulsator 7 is coupled to the upper end of the agitation shaft 11.

The clutch assembly 17 has a solenoid as a driving source, for example, and is controlled by a control device (refer to FIG. 5) that is mainly composed of a computer. This allows the clutch assembly 17 to transmit driving force of the washing machine motor 9 to the pulsator 7 through the agitation shaft 11 while the washing tub 5 is fixed, that is, stop in steps of washing and water-saving rinsing, thereby directly and rotationally driving the pulsator 7 in forward and reverse directions. In a step of dewatering, the clutch assembly 17 transmits driving force of the washing machine motor 9 to the washing tub 5 through the tub shaft 10 while the tub shaft 10 and the agitation shaft 11 are coupled to each other, to directly and rotationally drive the washing tub 5 and the pulsator 7 in one direction at high speed. As illustrated only in FIG. 5, the washing machine motor 9 is provided with a rotation sensor 18 that detects a rotational position of the rotor, and a current sensor 19 that detects a current flowing in the winding of the washing machine motor 9.

The top cover 3 is formed in the shape of a thin hollow box whose lower face is open and top face inclines downward and forward, and in its central portion, a substantially circular entrance door for laundry is formed at a position above the washing tub 5. The top face of the top cover 3 is formed in the shape of a rectangular panel as a whole, and includes a lid 12 for opening and closing the entrance door. While there is no detailed illustration, an operation panel (refer to FIG. 5) in a horizontally long shape is provided in a front edge portion of the top face of the top cover 3. There is provided a feedwater assembly composed of the water supply valve 52 (refer to FIG. 5) for feeding water into the water tank 4, that is, washing tub 5 in a rear portion inside the top cover 3.

Then, the washing tub 5 will be described also with reference to FIG. 2. In detail, the washing tub 5 includes a tub bottom portion 16 that is coupled to a lower end of a body section 15 in a cylindrical shape, and the rotating balancer 6 that is coupled to an upper end of the body section 15. The body section 15 is formed of a metal plate, such as a stainless steel plate, in the shape of a cylinder with open upper and lower faces, and includes the many drain holes 15*a* for dewatering that are formed in a portion other than a portion where a water passage described below is formed, that is, a portion to which a cover member is attached. The tub bottom portion 16, which is made of plastic, is formed in the shape of a circular container and joined to a lower portion of the body section 15 by crimping and screwing.

A circular area that is the inner bottom of the tub bottom portion 16 includes a pump chamber 20 formed between the circular area and the pulsator 7. The tub bottom portion 16 also has an outer peripheral portion in which an outflow port 21 is formed at each of three positions being 120 degrees apart from each other in a circumferential direction. The pulsator 7 is formed in the shape of a disk, and has projecting portions for creating a water flow on its top face that is a face. In a back face of the pulsator 7, a plurality of pump blades 22 extending radially in the shape of a thin plate is integrally provided to be positioned in the pump chamber 20. This constitutes a centrifugal pump, so that washing liquid, that is, water or water in which detergent is dissolved in the washing tub 5 is discharged toward three outflow ports 21 of an outer periphery of the pump chamber 20 by rotation of the pulsator 7.

In a side wall portion of the washing tub 5, there is provided a pumping water passage 23 that is a water passage used to pump up washing liquid in the washing tub 5 through each of the outflow ports 21 of the pump chamber 20 and to discharge (sprinkle) a shower water flow, as a circulating water flow in this case, from an upper portion of the washing tub 5. Here, a plurality of water passages 23, such as three water passages 23, extending vertically is provided at respective positions being 120 degrees apart from each other in a circumferential direction of the washing tub 5. In this case, each of the water passages 23 from outflow port 21 portion of the tub bottom portion 16 of washing tub 5 to the body section 15 is formed when a cover member is attached.

At this time, in the present embodiment, when the three water passages 23 are formed, a first cover member 24 is provided at each of the two places in the washing tub 5. In the other one place, there is provided a second cover member 25 that is different from the first cover member 24 in structure. A roller unit, in which the roller is unitized, is attached to the first cover member 24. Structure of the first cover 24 and the roller as well as the roller unit will be described below.

Figure 1:
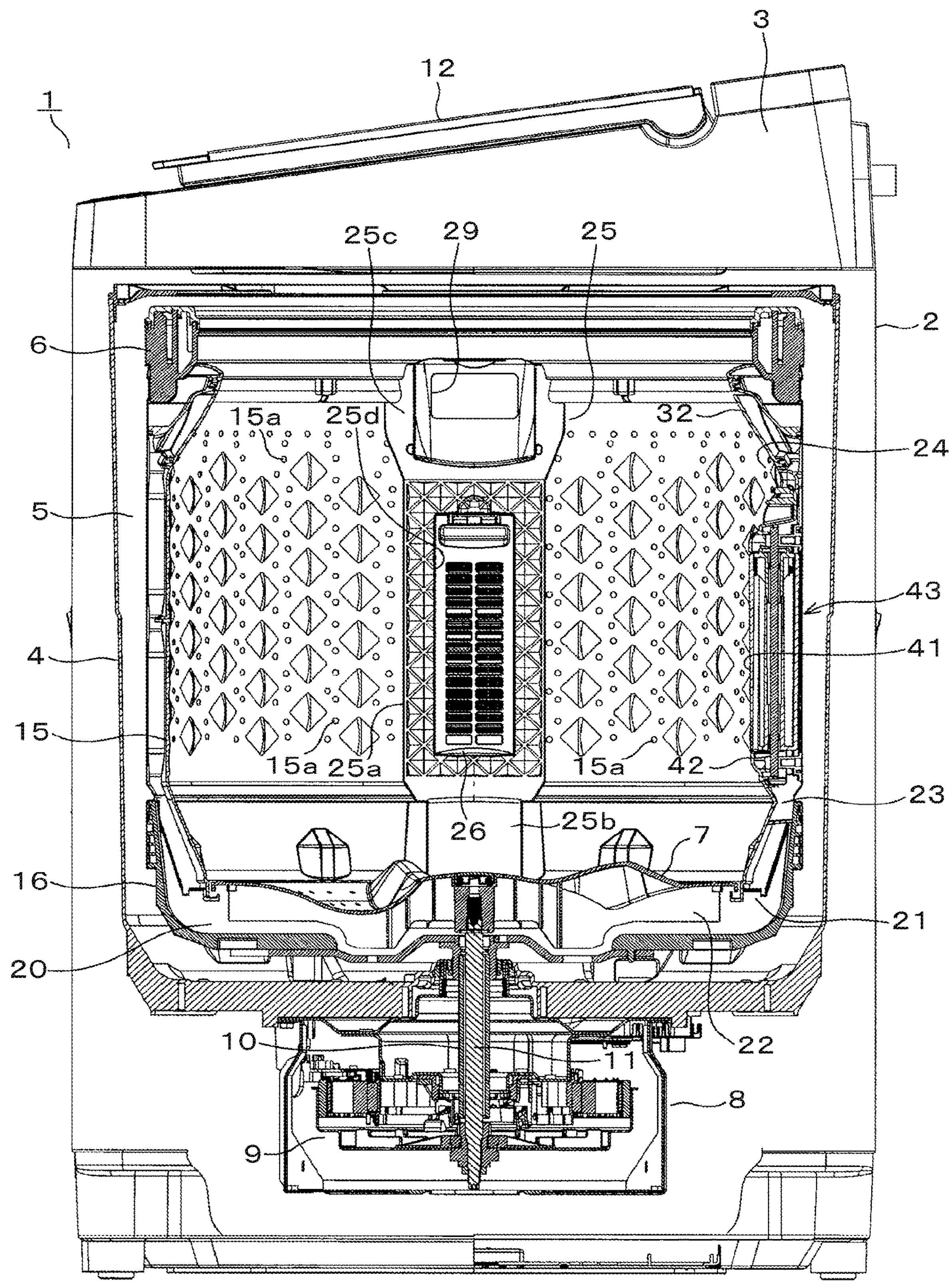
FIG. 1 is a longitudinal sectional side view schematically illustrating a structure of a washing machine according to a first embodiment.

The second cover member 25 is formed of a plastic molding, and formed in a substantially plate shape long in a vertical direction as a whole, as illustrated in FIGS. 1 and 2. The second cover member 25 integrally includes a main portion 25*a* that is disposed on an inner peripheral surface side of the body section 15, a lower coupling portion 25*b* that is provided in the lower portion of the main portion 25*a* to be coupled to the outflow port 21 of the tub bottom portion 16, and an extension portion 25*c* provided to extend upward and inward from an upper portion of the main portion 25*a* to the rotating balancer 6. The main portion 25*a* has a cross section in the shape of an arc that curves toward an opposite side to a curved surface of the body section 15.

As illustrated in FIG. 1, a rectangular opening 25*d* that is vertically long is formed in the main portion 25*a* of the second cover member 25. A filter member 26 is detachably attached so as to block the rectangular opening 25*d*. While there is no detailed illustration, the filter member 26 is formed in the shape of a rectangular plate as a whole, and includes a plurality of water passing holes each of which is formed in the shape of a slit that is horizontally long, being provided in a surface of the rectangular plate, and includes a well-known structure composed of a net-like filter for capturing lint, which is attached over the water passing hole.

In the extension portion 25*c* of the second cover member 25, there is provided a detergent input port 29 that is positioned below the rotating balancer 6 and is open in an inner wall portion of the washing tub 5. While there is no detailed description, the second cover member 25 formed as described above is attached to the washing tub 5 by fitting a fitting claw and a fitting hole to each other, for example. At this time, while there is no illustration, there is provided a packing along right and left edge portions of FIG. 1 on a back face of the cover member 25, and a space between the back face of the cover member 25 and the internal wall surface of the washing tub 5 is sealed in a watertight manner to form the water passage 23.

Consequently, when starting washing operation, a user can previously input the amount of detergent required through the detergent input port 29. When the washing operation is started to rotate the pulsator 7, washing water in the washing tub 5 is circulated so as to rise from the outflow port 21 of the pump chamber 20 through the water passage 23 to be supplied into the washing tub 5 through the water passing holes of the filter member 26. At the time, the input detergent is fed into the washing tub 5 while being dissolved in water. Then, lint contained in the washing water is captured by a filter of the filter member 26. When the filter member 26 is detached from the second cover member 25, the filter can be easily cleaned.

In the case where the driving force of the washing machine motor 9 is transmitted to the pulsator 7 through the agitation shaft 11, for example, when the washing machine motor 9 is rotated in normal direction, the pulsator 7 is rotated counterclockwise, that is, rotated leftward when seen from above, and produces an inwardly whirling water flow. Whereas, when the washing machine motor 9 is rotated reversely, the pulsator 7 and the pump blades 22 are rotated clockwise, that is, rotated rightward when seen from above, and produce an outwardly pushing water flow. Further, with the normal and reverse rotations of the pulsator 7, a shower water flow passing through the water passage 23 is produced, and the washing water is poured from above the washing tub 5 to the laundry.

Figure 3:
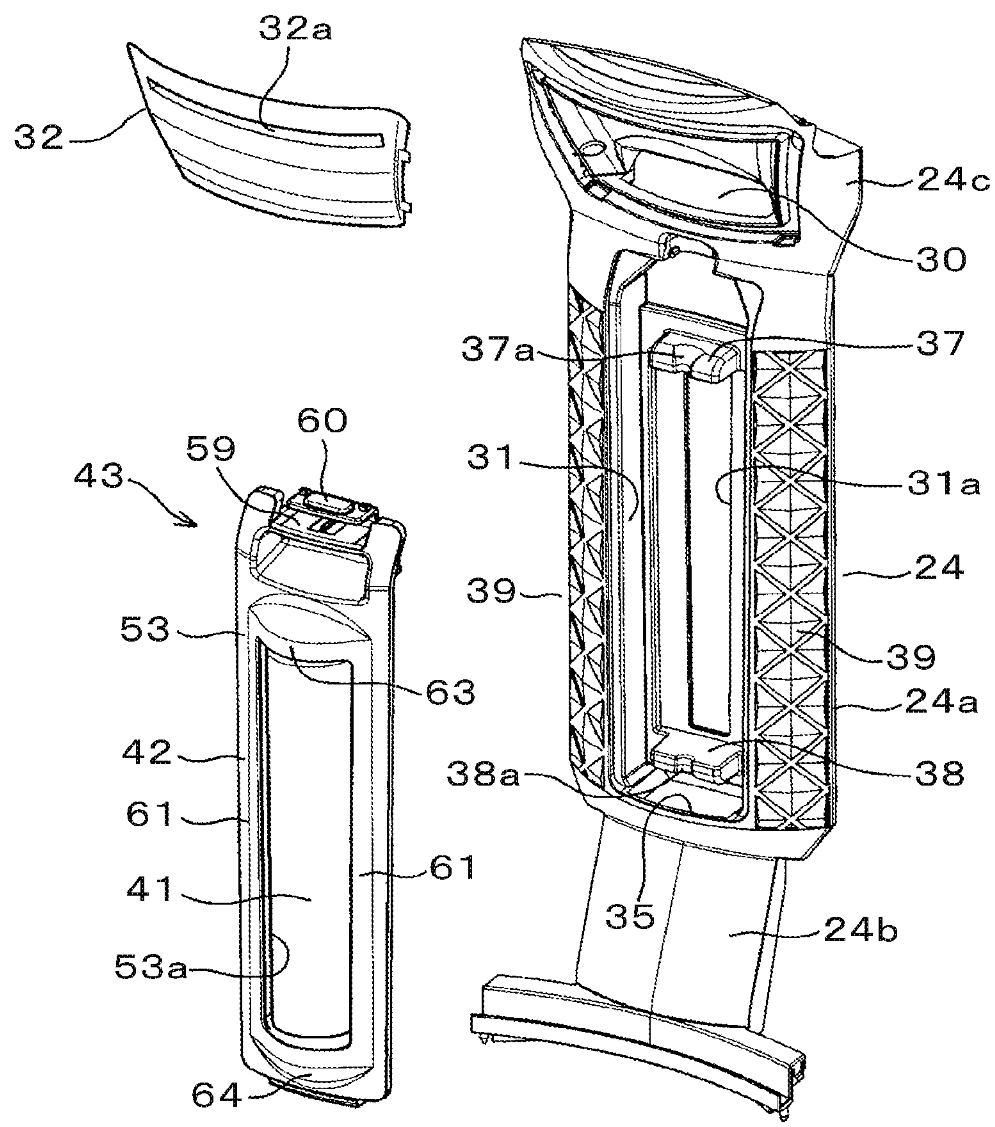
FIG. 3 is an exploded perspective view illustrating an attachment structure of a roller unit with respect to a first cover member according to the first embodiment.

The first cover member 24 will now be described also with reference to FIGS. 3 and 4. The first cover member 24 is formed of a plastic molding, and has an outline that is almost the same as that of the second cover member 25 described above. That is, as illustrated in FIG. 3, the first cover member 24 is formed in a substantially plate shape long in a vertical direction as a whole. The first cover member 24 integrally includes a main portion **24*a* disposed on an inner peripheral surface side of the body section 15, a lower coupling portion 24*b* provided in a lower portion of the main portion 24*a* to be coupled to the outflow port 21 of the tub bottom portion 16, and an extension portion 24*c* provided to extend upward and inward from an upper portion of the main portion 24*a* to the rotating balancer 6**.

As illustrated in FIG. 3, the extension portion **24*c* has a front face with an opening in an inverted trapezoidal shape, and is formed in a thin shape recessed backward to be connected to an upper end of the main portion 24*a* on a back face side water passage 23 through a communication port 30 formed in a bottom portion of a back wall of the extension portion 24*a*. In addition, a discharge port cover 32 is attached to the opening in the front face of the extension portion 24*c* to block the opening. In the discharge port cover 32, a discharge port 32*a* in the shape of a slit that is horizontally long is formed at a position close to an upper portion of the discharge port cover 32**.

The main portion **24*a* has a cross section in the shape of an arc that curves toward an opposite side to the curved surface of the body section 15, as a whole. In a rectangular area that is vertically long in a front face portion of the main portion 24*a*, there is provided an attachment section 31 in a recessed shape, in which a roller unit described below is detachably attached. The attachment section 31 is formed in the shape of a rectangular case that is vertically long, and includes right and left sidewalls, a back wall, and a front face that is open. In the back wall of the attachment section 31, an opening 31*a* being vertically long is formed in a back face of a portion where a roller described below is disposed. The roller described below is provided in a form separated from the water passage 23**.

In this case, right and left portions of the opening in the front face of the attachment section 31 in the main portion **24*a* is formed as the corresponding cover-side-curved walls 39 and 39 that gradually expand toward an inner periphery side from right and left ends of the opening toward a center portion, respectively, as viewed from above. As described in detail below, the cover-side-curved walls 39 and 39** constitute the corresponding side expanded portions together with a curved wall of a holding member, that is, holding-member-side curved wall.

Although not shown in detail, the first cover member 24 is also attached to the washing tub 5, for example, by fitting a fitting claw and a fitting hole to each other. Consequently, although not shown in detail, the water passage 23 for raising the washing water and supplying a shower water flow, or a circulating water flow in this case, is formed between the first cover member 24 and an inner periphery wall of the body section 15 of the washing tub 5. The water passage 23 is water-tightly sealed with packing or the like. The water passage 23 extends upward from the outflow port 21 to a bottom portion of the attachment section 31, and then forks into two branches to extend upward in the right and left across the opening **31*a* of the attachment section 31. The two branches rejoin above the attachment section 31 and reach the communication port 30. The washing water having passed through the communication port 30 reaches the inside of the extension portion 24*a*, that is, the front face side, and is discharged into the washing tub 5 through the discharge port 32*a* of the discharge port cover 32**.

Then, as illustrated in FIG. 3, the attachment section 31 of the first cover member 24 includes a fitted portion 35 positioned in a lower edge portion of the attachment section 31 to fit a fitting piece of the roller unit described below. In addition, in an upper edge portion of the attachment section 31, there is provided a fitting hole (not illustrated) into which a fitting projecting portion of the roller unit described below is to be fitted. The attachment section 31 further includes an upper holding section 37 and a lower holding section 38 that are positioned in an upper portion and a lower portion of the opening **31*a* to hold upper and lower ends of a shaft of the roller described below, respectively, in a state where the shaft is prevented from coming off. The upper holding section 37 and the lower holding section 38 include respectively recessed portions 37*a* and 38*a*** each formed in a U-shape at a central portion of a leading end face on one side of an oblong plate projecting forward.

As illustrated in FIGS. 1 and 2, and the like, a roller 41 in a cylindrical shape is rotatably provided in the inner wall portion of the washing tub 5 described above with its rotation axis vertically oriented and is rotated to facilitate movement of laundry. As illustrated in FIGS. 3 and 4, and the like, the roller 41 is held by a holding member 42 to form a roller unit 43 in the present embodiment, and is detachably attached to the attachment section 31 of the first cover member 24 in a state of the roller unit 43. The roller 41 and the roller unit 43 will be described in detail below also with reference to FIG. 4.

First, the roller 41 will be described. As illustrated in FIG. 4, etc., the roller 41 is formed from, for example, a synthetic resin into an elongated cylindrical shape, that is, a hollow cylindrical shape, and has shafts 46 and 46 projecting by a predetermined length in the axial direction from the center of each of the upper and lower end faces thereof. Moreover, three openings 49 are formed in the bottom face of the roller 41. In the present embodiment, the length of the roller 41 in the vertical direction is, for example, 135 mm.

With respect to the roller 41 with the structure described above, the holding member 42 is formed as follows. That is, as illustrated in FIGS. 3 and 4, the holding member 42 is formed of a plastic molding, and is formed in a rectangular shape being vertically long so as to block the attachment section 31 of the first cover member 24 as a whole. Then, the holding member 42 is also formed in the shape of a case whose back face is open and that is thin in a fore-and-aft direction. The holding member 42 has a front face central portion that forms an expanded portion 53 having an arc-like, so-called barrel-type shape expanding forward as viewed from its top face. In addition, the expanded portion 53 is provided with a rectangular opening 53*a* to expose a part of an outer peripheral surface of the roller 41, an area less than half of the entire area in this case. The rectangular opening 53*a* is formed to have a vertical length corresponding to a length of the roller 41, allowing the roller 41 to be fit.

Then, as illustrated in FIG. 3, and the like, portions positioned right and left across the rectangular opening 53*a* form corresponding holding-member-side curved walls 61 and 61 as curved walls in a front face portion of the expanded portion 53 of the holding member 42. The holding-member-side curved walls 61 and 61 extend to the corresponding cover-side-curved walls 39 and 39 to form corresponding side expanded portions with the corresponding cover-side-curved walls 39 and 39. The side expanded portions are provided at the corresponding both side portions across the roller 41, and extend so as to form a smooth curve along an exposed outer periphery wall surface of the roller 41, thereby serving to smoothly guide laundry toward the roller 41.

As illustrated in FIG. 3, a portion of the front face portion of the expanded portion 53 of the holding member 42 positioned at an upper portion of the opening 53*a* forms an upper expanded portion 63. In addition, a portion positioned at a lower portion of the opening 53*a* forms a lower expanded portion 64. The upper expanded portion 63 is provided in an upper portion of the roller 41 in a form of smoothly extending to an upper end of the roller 41. Likewise, the lower expanded portion 64 is provided in a lower portion of the roller 41 in a form of smoothly extending to a lower end of the roller 41.

Figure 4:
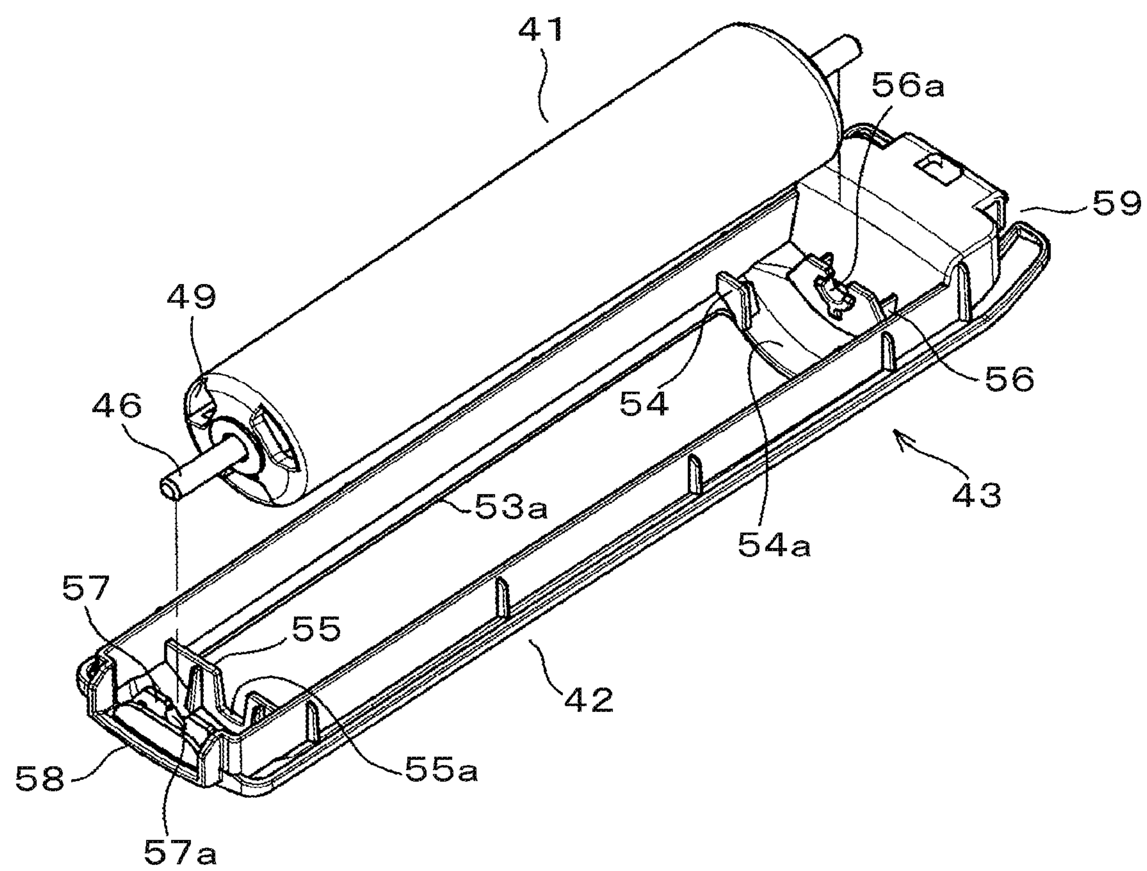
FIG. 4 is an exploded perspective view of the roller unit according to the first embodiment as viewed from the back face side.

As illustrated in FIG. 4, an upper wall portion 54 is integrally provided in an upper end portion of the rectangular opening 53*a* on a back face, that is, inner surface side of the holding member 42, and a lower wall portion 55 is integrally provided in a lower end portion of the rectangular opening 53*a*. At this time, a wide upper cutout portion 54*a*, which allows a cylindrical rib provided on the upper end face of the roller 41 to be disposed, or pass through, is formed in the upper wall portion 54 so as to open toward the back side. In the lower wall portion 55, a narrow lower cutout portion 55*a* through which the shaft 46 of the roller 41 can pass is formed so as to open toward a back face side of the lower wall portion 55.

On the back face, that is, inner surface side of the holding member 42, an upper bearing portion 56 is integrally provided at a position rather above the upper wall portion 54 to rotatably support an upper end portion of the shaft 46 of the roller 41. In addition, on the back face side of the holding member 42, a lower bearing portion 57 is integrally provided at a position rather below the lower wall portion 55 to rotatably support a lower end portion of the shaft 46 of the roller 41. The upper bearing portion 56 and the lower bearing portion 57 respectively include U-shaped cutout portions 56*a* and 57*a* being open toward the corresponding back face sides. The roller 41 is rotatably supported to the upper bearing portion 56 and the lower bearing portion 57 when the shaft 46 of the roller 41 is inserted into the cutout portions 56*a* and 57*a* from the corresponding back face sides.

Further, a structure for detachably attaching the roller unit 43 to the attachment section 31 of the first cover member 24 is provided in the holding member 42 as follows. That is, as illustrated in FIG. 4, a fitting piece 58 projecting downward in a horizontally long shape is integrally provided in a lower end portion of the holding member 42. When the fitting piece 58 is inserted into the fitted portion 35 of the attachment section 31 from above, the lower end portion of the holding member 42 is fitted in a state where the lower end portion is prevented from coming off forward.

On the other hand, in the upper end portion of the holding member 42, as illustrated in FIG. 3, a knob portion 59 is integrally provided, and a fitting projecting portion 60 is provided. The fitting projecting portion 60 is detachably fitted into the fitting hole 36 of the attachment section 31. Consequently, gripping and elastically deforming the knob portion 59 allows the fitting projecting portion 60 to be attached to or detached from the fitting hole 36.

In the roller unit 43 with the structure described above, the roller 41 is housed in the holding member 42 from a back face side of the holding member 42, and is held in the expanded portion 53, as illustrated in FIG. 4.

Specifically, the upper end portion of the shaft 46 of the roller 41 is inserted into the cutout portion 56*a* of the upper bearing portion 56 to be rotatably supported. Then, the rib in an upper end face portion of the roller 41 is disposed in the wide upper cutout portion 54*a* of the upper wall portion 54. In addition, the lower end portion of the shaft 46 is inserted into the cutout portion 57*a* of the lower bearing portion 57 to be rotatably supported. Then, a portion of the shaft 46 just below a lower end face of the roller 41 is disposed in the narrow lower cutout portion 55*a* of the lower wall portion 55.

This allows the roller 41 to be rotatably held in the holding member 42, and a front portion of the roller 41, that is, a portion within a range rather less than a semicircle thereof is disposed in the rectangular opening 53*a* to be exposed forward. In this holding state, the rib in the upper end face of the roller 41 is disposed in a gap portion between the rectangular opening 53*a* on the upper end face side of the roller 41 and the roller 41 to serve to prevent a cloth from being caught. Also, since the rib is provided, the roller 41 is configured not to be attached upside down to the holding member 42.

Then, the roller unit 43 is detachably attached to the attachment section 31 of the first cover member 24 in the inner wall portion of the washing tub 5. When the roller unit 43 is attached to the attachment section 31, first, the fitting piece 58 at a lower end of the holding member 42 is inserted into the fitted portion 35 in a lower end portion of the attachment section 31 from obliquely above to be fitted. Next, while the knob portion 59 is elastically deformed by gripping, an upper portion of the roller unit 43 is fitted into the attachment section 31 to allow the fitting projecting portion 60 to be fitted into the fitting hole 36.

This allows the roller unit 43 to be attached to the attachment section 31 so as to be fitted thereinto. Then, as illustrated in FIG. 1, the upper holding section 37 and the lower holding section 38 are provided in the first cover member 24 on a back face side of the roller unit 43. This allows the roller unit 43 to be prevented from coming off backward, that is, back face side by the upper holding section 37, in the upper end portion of the shaft 46 of the roller 41 just below the upper bearing portion 56. The roller unit 43 is also prevented from coming off backward, that is, to the back face side, by the lower holding section 38, in the lower end portion of the shaft 46 just above the lower bearing portion 57. Thus, since the roller 41 and the roller unit 43 are detachably provided in the washing tub 5, the user can easily detach and clean the roller 41, and cleanability is improved.

In this attachment state of the roller unit 43, as illustrated in FIG. 1 and FIG. 2, the roller 41 is rotatably disposed with the rotation axis vertically oriented at a middle portion in the inner wall portion of the washing tub 5. The roller 41 rotates itself to facilitate movement of laundry in a circumferential direction along the inner wall of the washing tub 5. At this time, the center axis of the roller 41 is positioned inward of the inner wall portion of the washing tub 5. Moreover, the holding-member-side curved wall 61 provided in the holding member 42 and the cover-side-curved wall 39 provided in the first cover member 24 located on both sides of the roller 41 are joined to form a smooth curve with respect to the exposed outer periphery wall surface of the roller 41. Hence, laundry is smoothly guided toward the roller 41.

Figure 6:
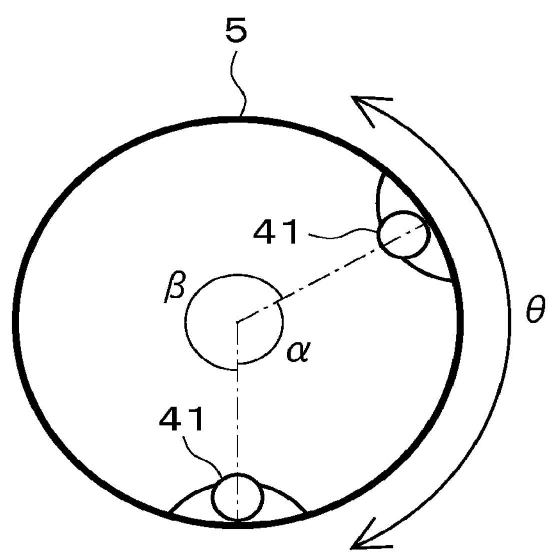
FIG. 6 is a plan view schematically illustrating the state of a roller disposed in the washing tub according to the first embodiment.

The roller unit 43 is attached to the first cover member 24 at each of two places. At this time, the first cover members 24 at the two places are provided at an interval of 120 degrees in the circumferential direction of the washing tub 5. Accordingly, as schematically illustrated in FIG. 6, the rollers 41 are also disposed at a predetermined angle interval $\alpha$, an angular interval of 120 degrees in this case (an angle $\beta$, that is, 240 degrees on the opposite wide side), in the circumferential direction of the washing tub 5.

In the above-described washing machine 1, a washing operation including a wash step is performed in the washing tub 5, and, in the wash step and a water-saving rinse step, the operation is performed at various set water levels according to the amount of laundry (clothes). In the present embodiment, as illustrated in FIG. 7, the water level, that is, the height of water surface in the washing tub 5 is set in 10 levels ranging from level 1 as the maximum water level to level 10 as the minimum water level.

Figure 7:
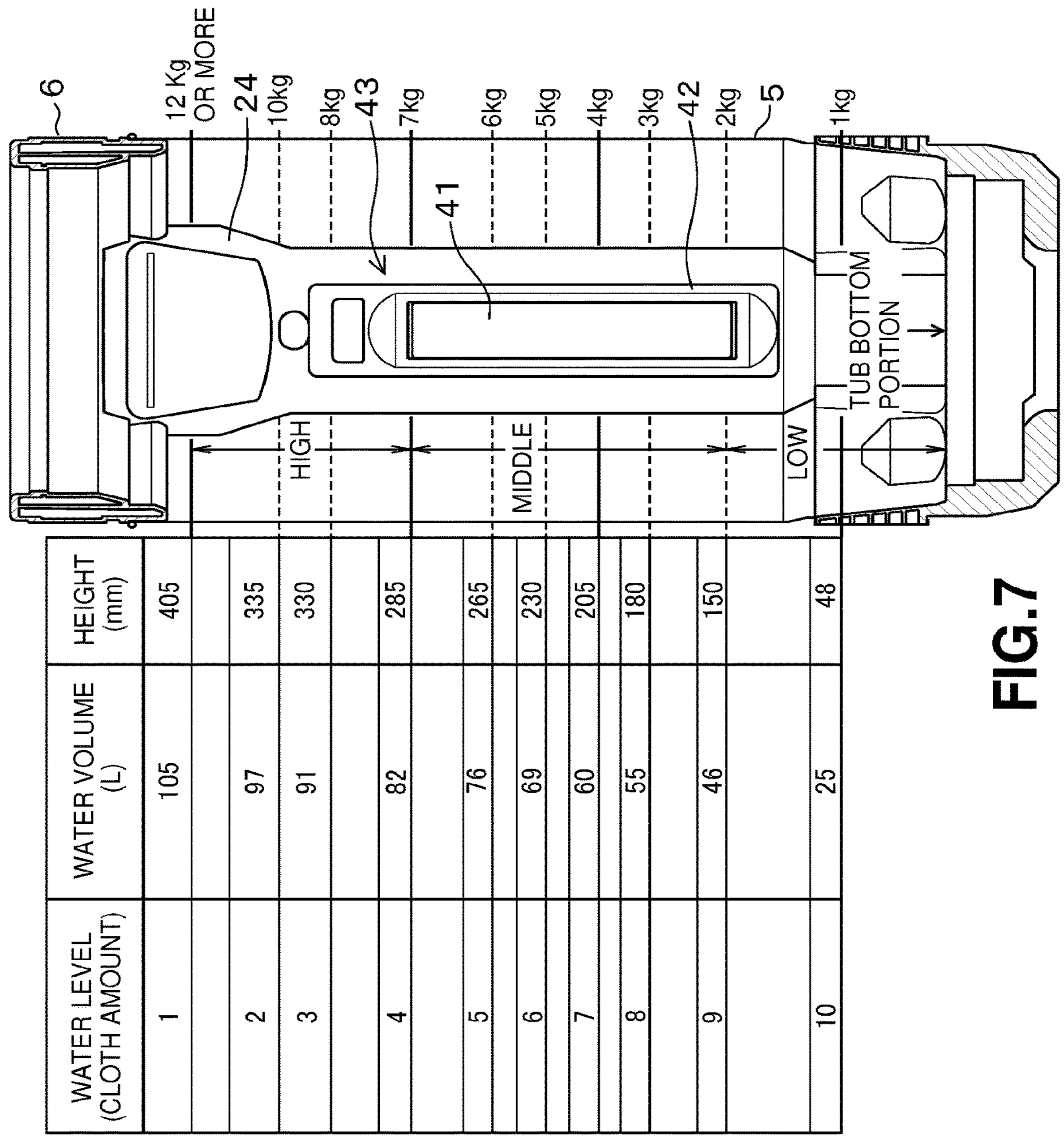
FIG. 7 is a view illustrating water levels in the washing tub according to the first embodiment.

FIG. 7 shows the relationships among each water level corresponding to the cloth amount, that is, the weight of clothes, the height position from the upper end of the pump chamber 20 that is the bottom of the washing tub 5, and the water volume at the water level as a table. Here, water level 1 that is the maximum water level is set when the cloth amount is 12 kg or more, and the height of water surface is 405 mm and the water volume is 100 liters. When the cloth amount is 10 kg, water level 2 is set, and the height of water surface is 335 mm and the water volume is 97 liters. When the cloth amount is 8 kg, water level 3 is set, and the height of water surface is 330 mm and the water volume is 91 liters.

When the cloth amount is 7 kg, water level 4 is set, and the height of water surface is 285 mm and the water volume is 82 liters. When the cloth amount is 6 kg, water level 5 is set, and the height of water surface is 265 mm and the water volume is 76 liters. When the cloth amount is 5 kg, water level 6 is set, and the height of water surface is 230 mm and the water volume is 69 liters. When the cloth amount is 4 kg, water level 7 is set, and the height of water surface is 230 mm and the water volume is 60 liters. When the cloth amount is 3 kg, water level 8 is set, and the height of water surface is 180 mm and the water volume is 55 liters. When the cloth amount is 2 kg, water level 9 is set, and the height of water surface is 150 mm and the water volume is 46 liters. When the cloth amount is 1 kg, water level 10 that is the minimum water level is set, and the height of water surface is 48 mm and the water volume is 25 liters.

The roller 41 is disposed as follows in relation to the water level. That is, as illustrated in FIG. 7, the roller 41 is disposed such that the upper end thereof is located at a position lower than water level 1 as the maximum water level and the lower end is located at a position higher than water level 10 as the minimum water level. Thus, the roller 41 is disposed such that the entire vertical length is within the range from water level 10 as the minimum water level to water level 1 as the maximum water level. At this time, the entire vertical length of the roller 41 is disposed over two or more water levels among the plurality of set water levels.

More specifically, the lower end of the roller 41 is located at a height of 150 mm from the bottom of the washing tub 5, that is, at a position equal to water level 9, and the upper end of the roller 41 is located at a height of 285 mm from the bottom of the washing tub 5, that is, at a position equal to water level 4. At this time, the water levels can be roughly classified such that water levels 1 to 3 are high water level, water levels 4 to 9 are medium water level, and water level 10 is low water level. The length and height position of the roller 41 correspond to the medium water level range. Further, in the present embodiment, the roller 41 is disposed such that the central portion in the axial length of the roller 41 is located at a water level that is ½ of water level 1 as the maximum water level in the washing tub 5, that is, at a position substantially equal to and slightly higher than the water level of water level 7.

Figure 5:
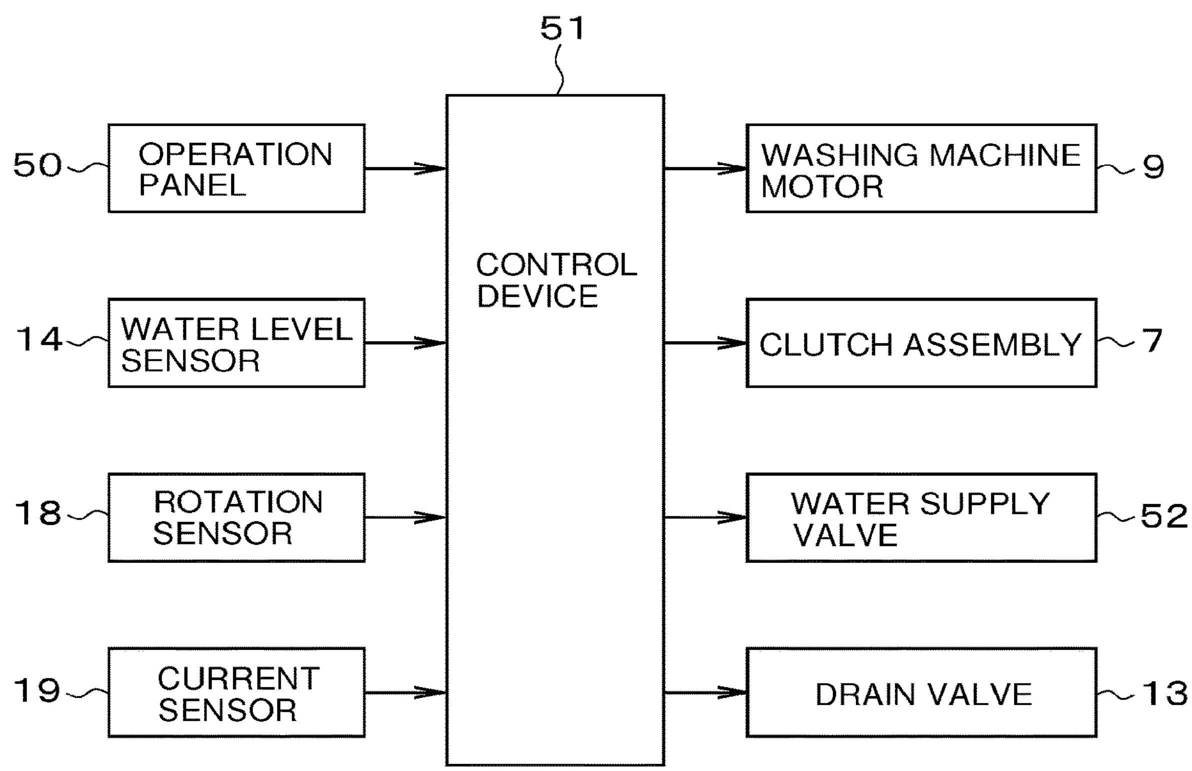
FIG. 5 is a block diagram schematically illustrating an electrical structure centering on a control device according to the first embodiment.

FIG. 5 schematically illustrates an electrical structure of the washing machine 1 centering on the above-described control device 51. The control device 51 is composed mainly of a microcomputer including a CPU, a ROM, a RAM, etc., and controls the entire washing machine 1 to execute each step of the washing operation. The control device 51 receives input of an operation signal from the operation panel 50, and controls the display of each display unit of the operation panel 50. Moreover, the control device 51 receives input of a detection signal of the water level in the washing tub 5 detected by the water level sensor 14, and also receives input of detection signals from the rotation sensor 18 and the current sensor 19.

The control device 51 controls driving of the washing machine motor 9 and the clutch assembly 17, and also controls the water supply valve 52 and the drain valve 13. With the above structure, the control device 51 controls each mechanism of the washing machine 1, based on the input signals from the respective sensors and a pre-stored control program according to the user's setting operations on a washing course through the operation panel 50. For example, in a known automatic operation course, a washing operation composed of wash, rinse and drain steps is executed.

In the automatic operation course, at the start of the operation, a cloth amount detecting operation for laundry in the washing tub 5 is executed. Then, based on the result of the cloth amount detecting operation, the water levels for washing and water-saving rinsing as described above are set at a plurality of levels, and the execution time of each step is automatically set. Control of water supply into the washing tub 5 is performed based on the detection of water level by the water level sensor 14. As is known, the cloth amount detecting operation is performed based on rotationally driving the pulsator 7 only for a short time by the drive assembly 8 and detecting a current flowing in the washing machine motor 9 at this time with the current sensor 19.

Figure 8:
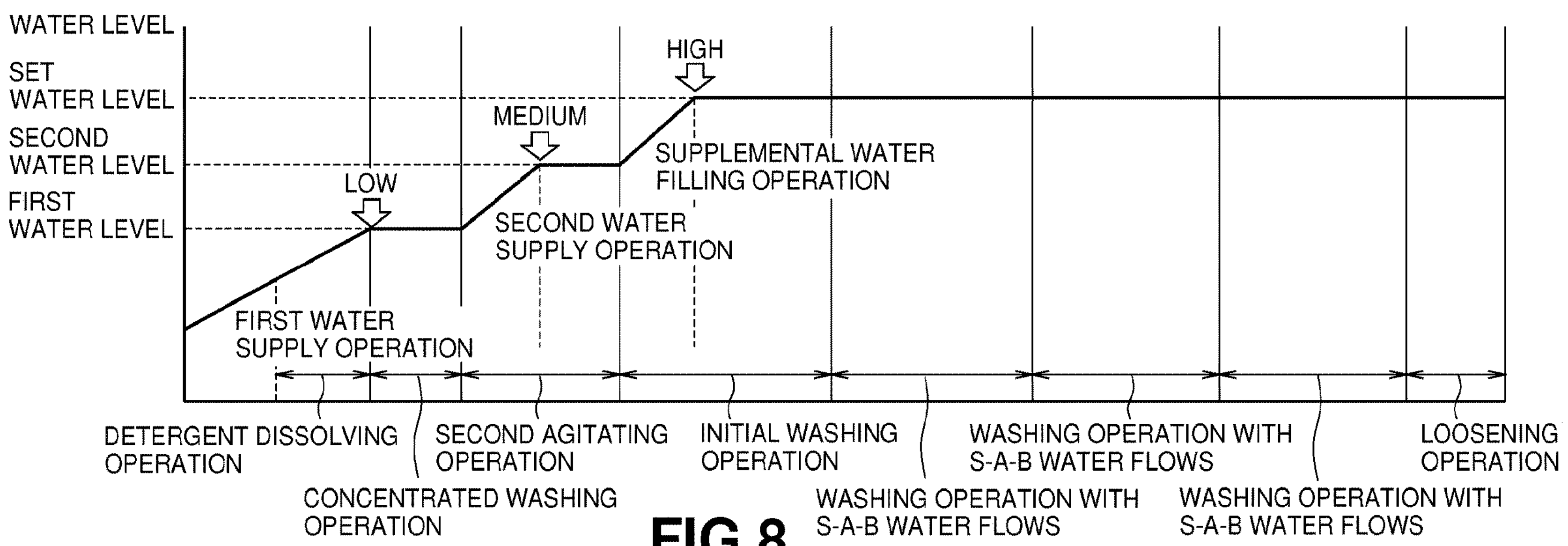
FIG. 8 is a view illustrating how the water level changes with each operation in a wash step according to the first embodiment.

Then, the control device 51 proceeds the wash step by performing control as shown in FIG. 8 to FIG. 10, according to the water level. At the start of the wash step, for example, the control device 51 supplies water up to a water level setting corresponding to the cloth amount, and, as illustrated in FIG. 8, water supply is performed separately in three steps, namely, a first water supply operation, a second water supply operation and a supplemental water filling operation. In this case, as illustrated in FIG. 8, for each water level, a first water level (concentrated washing water level) slightly lower than the set water level, and a second water level (medium water level) equal to or higher than the first water level are set with respect to the set water level. Further, a start water level of a detergent dissolving operation is also set.

In one example, at water level 3, while the set water level is 330 mm, the first water level is 302 mm and the second water level is 315 mm. The start water level of the detergent dissolving operation is 92 mm. At water level 8, while the set water level is 180 mm, the first water level is 151 mm and the second water level is 164 mm. The start water level of the detergent dissolving operation is 2 mm.

In the first water supply operation, water is supplied to the first water level, and in the latter half of the operation, the detergent dissolving operation is executed by rotationally driving the pulsator 7, in normal and reverse directions in this case, only for a very short time. Consequently, the detergent is dissolved in water, and a relatively thick detergent solution is produced. When the first water supply operation is completed, the water supply is temporarily stopped, and the concentrated washing operation in which the pulsator 7 is rotationally driven in normal and reverse directions in this case, that is, a first agitating operation is performed only for a predetermined time while retaining the first water level. Thus, the first water level is the concentrated washing water level. Except for the cases where the water level is low, that is, water level 9 or 10, the roller 41 is disposed such that the lower end thereof is located at a position lower than the concentrated washing water level. In the concentrated washing operation, laundry is washed with a thick detergent solution for a short time.

When the concentrated washing operation is completed, the second water supply operation of supplying water to the second water level is executed, and also a second agitating operation is executed for a predetermined time. The second agitating operation is performed by rotationally driving the pulsator 7, that is, by rotating the pulsator 7 in normal and reverse directions. With the second agitating operation, the laundry will contain the detergent solution, and accordingly the water level will be slightly decreased. When the second agitating operation is completed, water will be supplied to the set water level, that is, the supplemental water filling operation of supplying water including the amount of water corresponding to the decrease in the water level is executed, and also an initial washing operation with an ST water flow is performed. As illustrated in FIG. 9, the ST water flow in the initial washing operation is a water flow equivalent to an A water flow, except for water level 10.

Thereafter, the washing operations with three kinds of water flows of different water flow strengths, namely, an S water flow, the A water flow and a B water flow, are sequentially executed, and this cycle is repeated, for example, three times. Subsequently, a loosening operation is executed, and the wash step is completed. As illustrated in FIG. 10, the S water flow and the A water flow are water flows that move the clothes up and down and transposes the clothes by repetition of normal rotation and reverse rotation of the pulsator 7. The B water flow is a water flow that performs so-called rubbing washing of clothes by repeating each of normal rotation and reverse rotation of the pulsator 7 for a relatively long time. The water flow for the loosening operation is a water flow that loosens the clothes by repeating normal rotation and reverse rotation of the pulsator 7 at short intervals.

Furthermore, in the present embodiment, the control device 51 sets a rotation angle θ of the pulsator 7 in one unit rotation operation to be an angle that causes the laundry moving circumferentially at the outer circumferential portion in the washing tub 5 to contact the roller 41 at least once. Specifically, in the present embodiment, as illustrated in FIG. 6, two rollers 41 are provided to form the predetermined angular interval α, 120 degrees in this case, with adjacent roller, and the angle β of 240 degrees on the wide side. The rotation angle θ in the unit rotation operation of the pulsator 7 is configured to be larger than the predetermined angular intervals α and β (240 degrees) at least in the washing operation. However, when the water level is low, that is, when the water level is 8 or greater, in some pieces of operations, for example, the detergent dissolving operation and the concentrated washing operation, exceptionally, there are cases where one rotation angle θ of the pulsator 7 is smaller (108 degrees or 180 degrees) than 240 degrees.

FIG. 9 and FIG. 10 show the time of normal rotation (N) of the washing machine motor 9, the rotation angle of the pulsator 7, the stop time, the time of reverse rotation (R), the rotation angle of the pulsator 7, the stop time, the rotation speed of the washing machine motor 9, etc. controlled by the control device 51 in each of the operations in the wash step as a table. In the figures, NR and RR indicate a normal rotation time period and a reverse rotation time period, respectively. In this case, although FIG. 9 and FIG. 10 are originally a sequential table, the table is split into two due to space. That is, FIG. 9 shows up to the first half of the initial washing operation in the wash step, and FIG. 10 shows the second half of the washing operation and the loosening operation.

Taking an example to explain, in the case of water level 3, as illustrated in FIG. 9, the pulsator 7 is controlled to be rotated in normal direction for 0.3 seconds (an angle of 126 degrees), stopped for 1.0 second, rotated in reverse direction for 0.3 seconds (an angle of 126 degrees), and stopped for 1.0 second in the detergent dissolving operation, that is, the lower row of the upper and lower rows in the table. The rotation speed of the washing machine motor 9 is 60 rpm.

In the concentrated washing operation, that is, the upper row in the table, the pulsator 7 is controlled to be rotated in normal direction for 0.8 seconds (an angle of 432 degrees), stopped for 0.5 seconds, rotated in reverse direction for 0.8 seconds (an angle of 432 degrees), and stopped for 0.5 seconds. The rotation speed of the washing machine motor 9 is 90 rpm. In the second agitating operation, the pulsator 7 is controlled to be rotated in normal direction for 0.4 seconds (an angle of 288 degrees), stopped for 0.8 seconds, rotated in reverse direction for 0.4 seconds (an angle of 288 degrees), and stopped for 0.8 seconds. The rotation speed of the washing machine motor 9 is 120 rpm. Thereafter, a main washing operation is started, and, with the ST water flow of the initial washing operation, the same operation as the operation with the A water flow is performed, except for water level 10.

As illustrated in FIG. 10, in the next washing operation, first, in the operation with the S water flow, the same operation as the operation with the A water flow is performed, except for water levels 1, 2 and 10. In the case of water level 3, in the operation with the A water flow, the pulsator 7 is controlled to be rotated in normal direction for 3.0 seconds (an angle of 2520 degrees), stopped for 0.8 seconds, rotated in reverse direction for 3.0 seconds (an angle of 2520 degrees), and stopped for 0.8 seconds. The rotation speed of the washing machine motor 9 is 140 rpm. In the operation with the B water flow, the pulsator 7 is controlled to be rotated in normal direction for 0.8 seconds (an angle of 672 degrees), stopped for 1.0 seconds, rotated in reverse direction for 0.8 seconds (an angle of 672 degrees), and stopped for 1.0 seconds. The rotation speed of the washing machine motor 9 is 140 rpm.

The washing operation with the S water flow, the A water flow and the B water flow described above is repeated three cycles. In the final loosening operation, the pulsator 7 is controlled to be rotated in normal direction for 0.5 seconds (an angle of 390 degrees), stopped for 0.6 seconds, rotated in reverse direction for 0.5 seconds (an angle of 390 degrees), and stopped for 0.6 seconds. The rotation speed of the washing machine motor 9 is 130 rpm. For each of the water flows in the initial washing operation, the washing operation and the loosening operation described above, generally, control is performed to decrease the unit ON time, the stop time and the rotation speed of the washing machine motor 9 as the water level is lowered.

Action and effect of the washing machine 1 with the structure described above will now be described. In the structure described above, the roller 41 is rotatably provided in the inner wall portion of the washing tub 5, so that movement of laundry in the washing tub 5 is facilitated to enable washing effect to be increased. In particular, when the amount of clothes of laundry in the washing tub 5 is large, the laundry is prevented from rotating, and thus stains of the laundry tend to be unevenly removed; however, the roller 41 can improve so-called laundry swirling, so that unevenness removal of stains as described above can be resolved.

In the present embodiment, the roller 41 is disposed with its rotation axis vertically oriented in the inner wall portion of the washing tub 5. Hence, laundry swirling is improved in the inner wall portion of the washing tub 5, thereby being effective. For example, when the roller is provided on the pulsator, improvement of laundry swirling is limited to some sections such as the bottom in the washing tub. Compared to this, it is possible to widely obtain an effect of facilitating the laundry swirling. By improving the swirling of cloth of clothing in the rotating direction, transposition of the cloth in the vertical direction is also facilitated.

According to the study of the present inventors, in the case where the roller 41 is rotatably provided in the inner wall portion of the washing tub 5 with the rotation axis vertically oriented, bringing laundry into contact with the roller 41 near the center portion thereof in the vertical direction improves swirling of cloth and enhances the effect of the roller 41. In the vertical axis type washing machine 1, the washing operations, that is, the wash and water-saving rinse steps are executed at water levels corresponding to the cloth amount of laundry, and the laundry moves in the upper part of the water level. In this case, moving the clothes in the vertical range where the roller 41 is present enhances the washing effect, and enables washing without a variation in the washing effect.

Incidentally, the present inventors carried out washing tests using standard contaminated cloth in accordance with JIS 9606. FIG. 11 shows the results of the washing tests, whereby the present inventors examined the difference in the washing effect between the washing machine 1 with the roller 41 of the present embodiment and a washing machine having a conventional structure without a roller. Although the tests were carried out with a plurality of loads, that is, a plurality of water levels, when the load was 16 kg and 13 kg, the tests were performed at water level 1. In the washing machine 1 with the roller 41 of the present embodiment, the washing effect was superior for all the loads as compared with the washing machine without a roller. At this time, when the load was 4 kg, the washing effect was 10% better as compared with the washing machine without a roller.

In the present embodiment, the roller 41 is disposed such that the entire vertical length extends over two or more water levels among the plurality of set water levels. In addition, the upper end of the roller 41 is located at a position lower than the maximum water level, that is, the water level of water level 1. According to the present embodiment, it is possible to sufficiently improve the washing effect by the roller 41. Moreover, in the present embodiment, the roller 41 is disposed such that the upper end thereof is located between the maximum water level and the minimum level. Hence, at any water level between the maximum water level and the minimum level, the roller 41 works on the clothes, thereby achieving the effect of the roller 41 over a wide range.

Further, in the present embodiment, the roller 41 is disposed such that the central portion in the axial length of the roller 41 is located at a position slightly higher than a water level that is ½ of the maximum water level (water level 1) in the washing tub 5. Therefore, the central portion of the roller 41 is located at a position where the clothes floating in the washing tub 5, that is, the clothes positioned on the upper side of the water level, easily contact the roller 41, thereby facilitating movement of the clothes by the roller 41 and enhancing the washing effect.

By the way, in the present embodiment, at the initial stage of the wash step, the concentrated washing operation that is washing at the concentrated washing water level lower than a set water level is performed. In some course in which at least the water level is water level 8 or greater, since the roller 41 is disposed such that the lower end thereof is located at a position lower than the concentrated washing water level, it is possible to facilitate movement of clothes in the concentrated washing operation and further enhance the effect of concentrated washing.

Furthermore, in the present embodiment, two rollers 41 are provided to form a predetermined angle $\alpha$, that is, an angular interval of 120 degrees. At this time, the rotation angle $\theta$ in one unit rotation operation of the pulsator 7 in the washing operation is an angle that causes the laundry moving circumferentially at the outer circumferential portion in the washing tub 5 to contact the roller 41 at least once. More specifically, when the two rollers 41 are provided at an angular interval of 120 degrees, the rotation angle $\theta$ in the unit rotation operation of the pulsator 7 is configured to be larger than the angular interval $\beta$ (240 degrees) on the wide side. Hence, it is possible to increase the contact frequency of clothes with respect to the rollers 41 and enhance the effect of the rollers 41.

(2) Second, Third Embodiments and Other Embodiments

Figure 12:
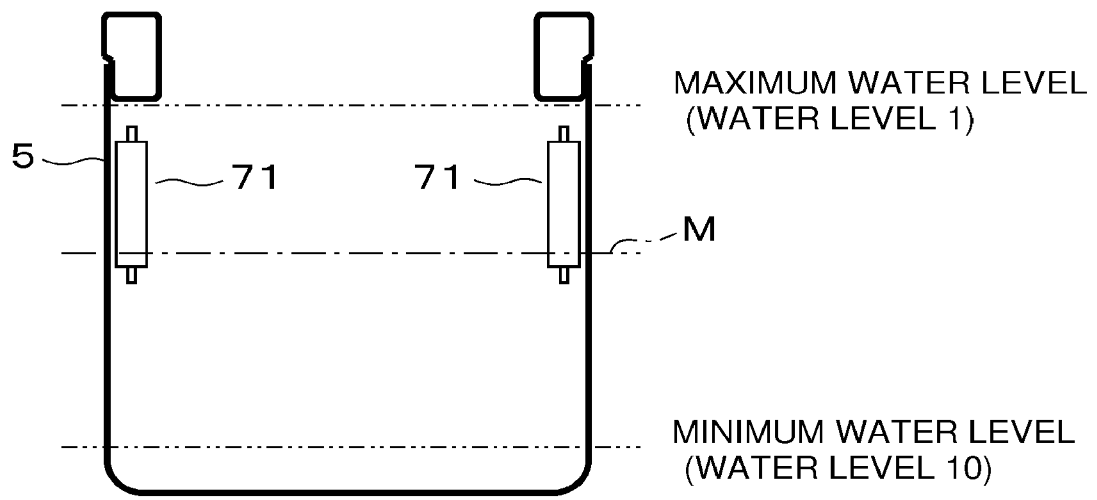
FIG. 12 is a schematic longitudinal sectional view of a washing tub according to a second embodiment.

FIG. 12 illustrates a second embodiment which is different from the first embodiment in the aspect that rollers 71 and 71 in the washing tub 5 are provided at higher positions. That is, in the second embodiment, the roller 71 is disposed such that the central portion in the axial length of the roller 71 is located at a position sufficiently higher than water level M that is ½ of the maximum water level in the washing tub 5, for example, at a height range from water level 4 to water level 5.

Here, regarding a washing machine capable of washing an amount of cloth, that is, a load in a range of 1 kg to 12 kg as in the present embodiment, the washing machine is highly frequently used with a medium cloth amount, for example, ranging from 4 kg to 8 kg, that is, ranging from water level 7 to water level 3. In the second embodiment, in the washing operation at water level 3 to water level 7, the roller 71 is located at a position where the clothes floating in the washing tub 5, that is, the clothes positioned on the upper side of the water level, easily contact the roller 71. Therefore, when performing washing for such a medium cloth amount, it is possible to facilitate movement of clothes by the roller 71 and enhance the washing effect.

Figure 13:
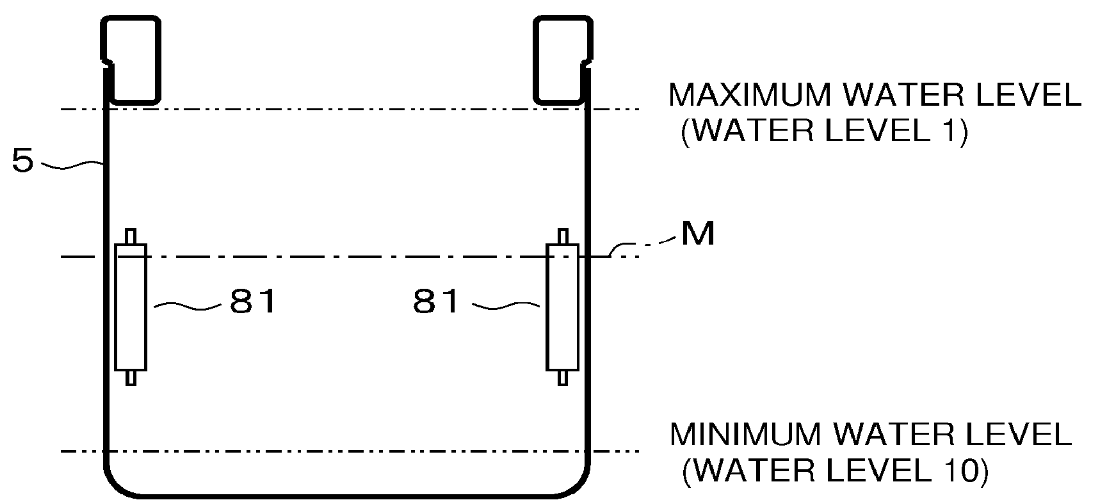
FIG. 13 is a schematic longitudinal sectional view of a washing tub according to a third embodiment.

FIG. 13 illustrates a third embodiment which is different from the first embodiment in the aspect that rollers 81 and 81 in the washing tub 5 are provided at lower positions. In the third embodiment, the roller 81 is disposed such that the central portion in the axial length of the roller 81 is located at a position lower than water level M that is ½ of the maximum water level in the washing tub 5, for example, at a height about water level 8 or 9. Accordingly, when performing the washing operation including the concentrated washing operation at a relatively low water level, the central portion of the roller 81 is located at a position where clothes easily contact the roller 81, thereby enhancing the washing effect.

Further, although not shown, the rotation angle θ in one unit rotation operation of the pulsator in the wash or rinse step can be an angle that causes the laundry moving circumferentially at the outer circumferential portion in the washing tub 5 to contact the roller at least once. For example, in the case where one roller is provided, the rotation angle θ in one unit rotation operation of the pulsator can be 360° C. or greater. Accordingly, it is also possible to increase the contact frequency of the clothes with respect to the roller and further enhance the effect of the roller.

In addition, various modifications can be considered about the roller structure. For example, one roller may be provided instead of a plurality of rollers, and, in this case, it is also possible to improve the washing effect by the roller. The outer circumferential surface of the roller may be configured in the shape of a tapered surface so that the outer diameter is the largest at the upper end and becomes gradually smaller toward the lower end. Further, it is possible to make various modifications for the structure of the holding member that holds the roller. In the first embodiment, although the roller is rotatably held by the holding member constituting the roller unit, the roller may be rotatably supported by providing an axially supporting portion on the washing tub 5 side. Consequently, as compared with the unit structure, the number of parts can be reduced, and a simple and inexpensive structure is achieved.

In addition, the lower end of the roller may be located at a position lower than the minimum water level, and accordingly, the effect of the roller can be obtained even when washing is performed at a lower water level. Since each embodiments described above are presented as examples, there is no intention to limit the scope of the invention. The embodiments described above can be practiced in various other aspects, and thus various omissions, replacements, and modifications may be made within a range without departing from the essence of the invention. The present embodiments and their variations are included in the scope and essence of the invention as well as in a range equal to that of the invention described in claims.

The invention claimed is:

1. A washing machine comprising:

a vertical axis type washing tub in which laundry and a washing liquid are housed and a washing operation including a wash step is performed;

a cover member provided at an inner wall portion of the washing tub to form a water passage, the water passage extending vertically between the washing tub and the cover member; and a roller attached to the cover member and rotatably provided in an inner wall portion of the washing tub in a state where a rotation axis is vertically oriented, the roller being rotated to facilitate movement of laundry, wherein the roller is positioned separated from the water passage, and further comprising a discharge port located above the roller, a water level of the washing liquid in the washing tub is sellable in a plurality of levels ranging from a minimum water level to a maximum water level, and the roller is disposed such that an entire vertical length extends over two or more water levels among the plurality of set water levels.

2. A washing machine comprising:

a vertical axis type washing tub in which laundry and a washing liquid are housed and a washing operation including a wash step is performed;

a cover member provided at an inner wall portion of the washing tub to form a water passage, the water passage extending vertically between the washing tub and the cover member; and a roller attached to the cover member and rotatably provided in an inner wall portion of the washing tub in a state where a rotation axis is vertically oriented, the roller being rotated to facilitate movement of laundry, wherein the roller is positioned separated from the water passage, and further comprising a discharge port located above the roller, a water level of the washing liquid in the washing tub is settable in a plurality of levels ranging from a minimum water level to a maximum water level, and the roller is disposed such that an upper end thereof is located at a position lower than the maximum water level.

3. The washing machine according to claim 1, wherein the roller is disposed such that an upper end thereof is located at a position higher than the minimum water level.

4. The washing machine according to claim 1, wherein the roller is disposed within a height range from the minimum water level to the maximum water level.

5. The washing machine according to claim 1, wherein the roller is disposed such that a central portion in an axial length of the roller is located at a position higher than a water level that is ½ of the maximum water level in the washing tub.

6. The washing machine according to claim 1, wherein the roller is disposed such that a central portion in an axial length of the roller is located at a position lower than a water level that is ½ of the maximum water level in the washing tub.

7. The washing machine according to claim 1, wherein the wash step includes a concentrated washing operation that is performed at a concentrated washing water level lower than a set water level, and the roller is disposed such that a lower end thereof is located at a position lower than the concentrated washing water level.

8. The washing machine according to claim 1, wherein a pulsator for agitating the washing liquid is provided at an inner bottom of the washing tub, the pulsator being configured to repeat a unit rotation operation in the wash step, and a rotation angle in one unit rotation operation of the pulsator is an angle that causes the laundry moving circumferentially at an outer circumferential portion in the washing tub to contact the roller at least once.

9. The washing machine according to claim 1, wherein a plurality of the rollers are provided in the washing tub so that a predetermined angular interval is formed between adjacent rollers, a pulsator for agitating the washing liquid is provided at an inner bottom of the washing tub, the pulsator being configured to repeat a unit rotation operation in the wash step, and a rotation angle in the unit rotation operation of the pulsator is larger than the predetermined angular interval.

* * * * *